Patented July 13, 1926

1,592,127

UNITED STATES PATENT OFFICE.

ROBERT W. POINDEXTER, JR., OF LOS ANGELES, CALIFORNIA, ASSIGNOR TO CALIFORNIA CYANIDE COMPANY, INC., OF NEW YORK, N. Y., A CORPORATION OF DELAWARE.

TRICALCIUM CYANIDE AND METHOD OF PRODUCING SAME.

No Drawing.    Application filed November 21, 1925.    Serial No. 70,712.

This invention relates to products containing calcium cyanide and to methods of preparing such products.

Hydrocyanic acid is recognized as a valuable commercial fumigant for the control of a very wide range of injurious insect and animal pests. Practically all forms of animal life are susceptible to its poisonous action. Plant life is distinctly less susceptible, hence this material can be used to destroy insect pests present in all sorts of agricultural and horticultural crops. Several processes for manufacturing hydrocyanic acid are in commercial operation.

In spite of the fact that hydrocyanic acid in liquid form has become a recognized article of commerce, there are distinct difficulties and dangers attendant upon its storage, transportion and use. In the first place, the material is an extremely volatile liquid, which makes necessary the use of reasonably strong and entirely tight containers to avoid any leakage in handling it, and, in the second place, it is subject to spontaneous decomposition (polymerization), which decomposition involves the setting free of a large amount of heat and has repeatedly resulted in the violent explosion of vessels in which the liquid is stored. This instability of the material constitutes a constant hazard in its transportation and use.

It is the object of the present invention to provide a solid product which is normally stable and adapted, therefore, for safe storage and transportation but which will yield hydrocyanic acid readily so that it can be used in place of liquid hydrocyanic acid for various purposes.

Other objects and advantages of the invention will be apparent as it is better understood by reference to the following specification in which the preferred embodiment of the invention is described.

My invention involves the fixation of hydrocyanic acid in the form of a product containing calcium cyanide. It is known that calcium cyanide can be produced in solution by the addition of hydrocyanic acid to a suspension of calcium hydroxide. When the solution is evaporated the cyanide is decomposed and the hydrocyanic acid is released, leaving only a residue of calcium hydroxide. The literature also refers to a compound having the formula

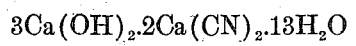

$$3Ca(OH)_2.2Ca(CN)_2.13H_2O$$

which is produced by passing dry hydrocyanic acid over pure calcium hydroxide. This product is moist and is extremely unstable even when protected from the atmosphere because of its high moisture content. It cannot be stored and transported safely and is unadapted, therefore, for any commercial use.

The product herein described is, on the other hand, free from water of crystallization and stable when protected from the atmosphere. It can be stored indefinitely in closed receptacles. It can be transported safely in such receptacles and retains its original composition until removed for use. The product decomposes rapidly when exposed to the atmosphere, releasing substantially its entire content of hydrocyanic acid within a relatively short time. The hydrocyanic acid escapes as a gas without any substantial amount of polymerization and the product provides, therefore, a source of hydrocyanic acid in a safe and easily transportable form.

I have discovered that calcium can be combined with the cyanide radical to produce a definite chemical compound, tricalcium cyanide, $Ca_3(OH)_4(CN)_2$, containing 21.650% cyanogen (1925 atomic weights). This compound can be produced in large quantities with an average cyanogen content of 20 to 21% or with approximately 97% of the theoretical composition. The difference is represented by impurities present in the raw materials used and the elimination of such impurities would permit the production of substantially 100% tricalcium cyanide.

I have found that the production of tricalcium cyanide depends upon the combination of substantially exact portions of calcium oxide, water and hydrocyanic acid. The proportions of water and hydrocyanic acid must be carefully regulated, since the use of an excess of either results in an inferior product. Too much water will increase the amount of calcium hydroxide and this compound in excess will tend to cause polymerization of the hydrocyanic acid. Likewise, the use of an excess of hydrocyanic acid results in polymerization, particularly in the presence of an excess of calcium hydroxide or water.

The correct proportioning of the several essential materials can be effected in a variety of ways; thus, burnt lime (CaO) of a commercial grade can be combined with the required quantity of hydrocyanic acid containing a predetermined amount of water, sufficient to produce the final product; a predetermined quantity of water can be added to burnt lime to produce the proper proportion of slaked lime $(Ca(OH)_2)$ and the hydrocyanic acid can be added to the resultant mixture of burnt lime and slaked lime; predetermined proportions of burnt lime and slaked lime can be mixed and the hydrocyanic acid can be added thereto; or any combination of the methods outlined can be employed, a part of the water being introduced with the lime and a part with the hydrocyanic acid.

To obtain uniform distribution of the hydrocyanic acid, it is preferable to conduct the operation in an apparatus, adapted to ensure thorough agitation of the material, such as a ball mill or the like. Such an apparatus also prevents the formation of lumps by contact of the liquid with the powdered material. Heat is evolved during the reaction and the pulverized material is a poor conductor of heat, so that local heating and consequent polymerization of the hydrocyanic acid may result. It is desirable, therefore, to add the hydrocyanic acid slowly and in proportion to the evolution of heat and also to cool the apparatus by the application of a cooling medium, such as water, thereto. This may be accomplished by providing a water jacket in the ball mill or other apparatus in which the reaction is conducted. The necessity for cooling may be avoided by adding the hydrocyanic acid more slowly but the rate of production is thereby decreased. The cooling should not be carried to the extent of retarding the reaction. The temperature preferred is below the boiling point of water.

The following example will serve to illustrate further the nature of my invention, which, however, is not confined to this example, and the method of carrying it into practical effect.

I placed in an apparatus, provided with suitable means for cooling, mixing and pulverizing, 126 pounds of commercial burnt lime (the composition of which had been determined). This lime had previously been pulverized to test 90% through a 200 mesh screen. I then added 18½ pounds of commercial hydrated lime (the composition of which had been determined). I then added, during a period of one hour and three minutes, 45 pounds of commercially pure liquid hydrocyanic acid, containing, as shown by actual analysis, 44½ pounds of hydrocyanic acid. The sum of the amounts of water of composition (hydration) in the commercial burnt lime plus that in the commercially hydrated lime, as shown by the analyses of these materials, plus the amount of water in the hydrocyanic acid employed, was such as to constitute that proportion of water necessary to form a final product of the formula $Ca_3(OH)_4(CN)_2$. The mass was agitated, cooled and pulverized throughout the entire period during which the hydrocyanic acid was being added. This operation resulted in the formation of 183 pounds of product, containing 21.0% of cyanogen (CN), this being an efficiency of approximately 90%, based on the hydrocyanic acid employed.

Numerous experiments which I have made show that in order to obtain a product having the highest cyanogen content, the ingredients should be proportioned in such a manner as to correspond to a formula of $Ca_3(OH)_4(CN)_2$. As already indicated, it is immaterial whether the corresponding proportion of calcium hydroxide be added to the mixture as such, or whether sufficient water be added, or whether sufficient water be contained in a diluted hydrocyanic acid, or any combination of these means. Since commercially burnt lime may contain a small amount of calcium hydroxide, and since commercially hydrated lime may contain either an excess or a deficiency of water beyond that required for the exact hydration, the composition of the materials used should be determined by analysis, and the quantities employed should be proportioned accordingly.

I have found that when hydrocyanic acid is introduced in excess of the ratio called for by the above formula, the result is a polymerization of the excess hydrocyanic acid, with a consequent darkening of the product and lowering of the cyanogen content of the final product. Likewise, I have found that water, introduced in any appreciable amount greater than is called for by the above formula, brings about premature completion of the reaction, and likewise results in polymerization of excess hydrocyanic acid, and at the same time renders the finished product less stable, the excess water inducing hydrolysis of the cyanide with the liberation of ammonia.

The product, $Ca_3(OH)_4(CN)_2$ is a dry, pulverulent material of a whitish or light yellowish brown color, which may vary to darker shades of brown in case an excess of hydrocyanic acid or water has been used, as stated above. It dissociates in water into calcium cyanide ($Ca(CN)_2$) and calcium hydroxide ($Ca(OH)_2$), the former passing into solution. A part of the calcium hydroxide is also dissolved, but the major portion remains, of course, undissolved. Any insoluble impurities in the lime originally treated also remain undissolved. The solution shows the characteristic reactions for cyanogen and calcium ions. When exposed to the atmosphere the product evolves hydrocyanic acid, the evolution being rapid and substantially complete. The product is, therefore, particularly useful as a fumigating agent to replace liquid hydrocyanic acid, since its use avoids the dangers incident to the handling and application of the volatile liquid. It has the added advantage for such use in that the residue, after liberation of the hydrocyanic acid, is substantially free from any alkali metal compounds and consists essentially of non-injurious calcium compounds and such inert impurities as are usually present in commercial grades of lime. The product is not, therefore, injurious to vegetation and it can be employed by dusting trees or plants to kill the pests which exist thereon.

Various changes may be made in the methods as described without departing from the invention or sacrificing any of the advantages thereof.

I claim:—

1. As an article of manufacture, the compound containing calcium cyanide combined with hydrated lime and free from water of crystallization.

2. As an article of manufacture, the compound containing calcium cyanide combined with hydrated lime and the impurities normally present in commercial lime, the compound being free from water of crystallization.

3. As an article of manufacture, a compound having a cyanogen content of approximately 21% and containing calcium cyanide combined with hydrated lime and free from water of crystallization.

4. As an article of manufacture the compound having a cyanogen content of from 20 to 21.65% and containing calcium cyanide combined with hydrated lime and free from water of crystallization.

5. As an article of manufacture the compound containing calcium cyanide and hydrated lime in the ratio of one to two and free from water of crystallization.

6. As an article of manufacture the dry pulverulent product containing calcium cyanide and hydrated lime, the product being free from water of crystallization and stable when protected from the atmosphere.

7. As an article of manufacture the compound containing calcium cyanide and hydrated lime, the compound being free from water of crystallization and from alkali metal compounds.

8. As an article of manufacture, the compound tricalcium cyanide, $Ca_3(OH)_4(CN)_2$.

9. As an article of manufacture, a product containing tricalcium cyanide, $Ca_3(OH)_4(CN)_2$ with the impurities usually present in commercial burnt lime.

10. As an article of manufacture, a product containing tricalcium cyanide $Ca_3(OH)_4(CN)_2$, which is substantially free from alkali metal compounds.

11. The method of preparing cyanogen compounds of calcium, which comprises combining lime, water and hydrocyanic acid in the proportions required by the formula $Ca_3(OH)_4(CN)_2$.

12. The method of preparing tricalcium cyanide, which comprises adding hydrocyanic acid to a mixture of lime and hydrated lime, all in the proportions required by the formula $Ca_3(OH)_4(CN)_2$.

13. The method of preparing tricalcium cyanide, which comprises mixing liquid hydrocyanic acid with lime in the presence of only enough water to produce a compound having the formula $Ca_3(OH)_4(CN)_2$.

14. The method of preparing tricalcium cyanide, which comprises slowly adding liquid hydrocyanic acid to lime in the presence of only enough water to produce a compound having the formula $Ca_3(OH)_4(CN)_2$.

15. The method of preparing tricalcium cyanide, which comprises mixing liquid hydrocyanic acid with lime in the presence of only enough water to produce a compound having the formula $Ca_3(OH)_4(CN)_2$, and cooling the mass during the reaction.

16. The method of preparing tricalcium cyanide, which comprises adding hydrocyanic acid to lime in the presence of only enough water to produce a compound having the formula $Ca_3(OH)_4(CN)_2$, and agitating the mass until the reaction is completed.

17. The method of preparing tricalcium cyanide, which comprises adding slowly hydrocyanic acid to lime in the presence of only enough water to produce a compound having the formula $Ca_3(OH)_4(CN)_2$ and agitating the mass until the reaction is completed.

18. The method of preparing tricalcium cyanide, which comprises adding hydrocyanic acid to lime in the presence of only enough water to produce a compound having the formula $Ca_3(OH)_4(CN)_2$, agitating the mass until the reaction is completed, and cooling the mass during the reaction.

19. The method of preparing tricalcium cyanide, which comprises adding slowly hydrocyanic acid to lime in the presence of only enough water to produce a compound having the formula $Ca_3(OH)_4(CN)_2$, agitating the mass until the reaction is completed, and maintaining the mass at a substantially uniform temperature during the reaction.

In testimony whereof I affix my signature.

ROBERT W. POINDEXTER, Jr.